United States Patent
Wang et al.

(10) Patent No.: US 11,440,484 B2
(45) Date of Patent: Sep. 13, 2022

(54) AIR OUTLET FIXTURE

(71) Applicant: SHENZHEN LANHE TECHNOLOGIES CO., LTD., Shenzhen (CN)

(72) Inventors: Cai-Xian Wang, Shenzhen (CN); Bo Zhang, Shenzhen (CN); Cai-Li Chen, Shenzhen (CN)

(73) Assignee: SHENZHEN LANHE TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/468,651

(22) Filed: Sep. 7, 2021

(65) Prior Publication Data

US 2022/0073009 A1 Mar. 10, 2022

(30) Foreign Application Priority Data

Sep. 5, 2020 (CN) .......................... 202021935795.2

(51) Int. Cl.
*B60R 11/02* (2006.01)
*B60R 11/00* (2006.01)

(52) U.S. Cl.
CPC ... *B60R 11/0241* (2013.01); *B60R 2011/0008* (2013.01); *B60R 2011/0059* (2013.01); *B60R 2011/0089* (2013.01)

(58) Field of Classification Search
CPC ......... B60R 11/0241; B60R 2011/0008; B60R 2011/0059; B60R 2011/0089
USPC .............. 248/229.2, 229.23, 229.24, 229.26, 248/231.51, 231.81, 231.9, 316.1, 316.5
See application file for complete search history.

(56) References Cited

U.S. PATENT DOCUMENTS

| | | | | |
|---|---|---|---|---|
| 5,979,724 A | * | 11/1999 | Loewenthal, Jr. | .. B60R 11/0241 224/483 |
| 7,746,028 B1 | * | 6/2010 | Yang | ....................... H04M 1/05 320/107 |
| 8,757,461 B2 | * | 6/2014 | Zanetti | ................... B60R 11/02 224/562 |
| 9,004,331 B2 | * | 4/2015 | Fan | ........................ B60R 11/02 224/483 |
| 9,744,913 B2 | * | 8/2017 | Ormsbee | ............. B60R 11/0241 |

(Continued)

FOREIGN PATENT DOCUMENTS

| | | |
|---|---|---|
| CN | 209719456 U | 12/2019 |
| CN | 210327675 U | 4/2020 |

*Primary Examiner* — Eret C McNichols
*Assistant Examiner* — Michael McDuffie
(74) *Attorney, Agent, or Firm* — ScienBiziP, P.C.

(57) ABSTRACT

The present disclosure provides an air outlet fixture. The air outlet fixture includes: a clamping assembly including a first clamping arm a second clamping arm, and a hinge articulating the first clamping arm and the second clamping arm, the first clamping arm and the second clamping arm, the first clamping arm including a first arm body, and the second clamping arm comprising a second arm body; an adjusting means coupled to the clamping assembly and configured for adjusting a clamping force of the clamping assembly; and a connecting member mounted to the clamping assembly and configured for connecting an external device; wherein, the clamping assembly further comprises a reinforcing member mounted to one of the first arm body and the second arm body, in at least one state the reinforcing member is driven by the adjusting means.

20 Claims, 8 Drawing Sheets

(56) References Cited

U.S. PATENT DOCUMENTS

| | | | | |
|---|---|---|---|---|
| 9,868,532 | B2* | 1/2018 | Balmer | B64D 11/0638 |
| 10,173,607 | B1* | 1/2019 | Omelchenko | B60R 11/0241 |
| 10,259,399 | B2* | 4/2019 | Yang | F16M 11/40 |
| 10,974,635 | B1* | 4/2021 | Tiringo | B60N 3/103 |
| 11,046,162 | B1* | 6/2021 | Priebe | B60H 1/245 |
| 2004/0040994 | A1* | 3/2004 | Parcelles | B60N 3/103 |
| | | | | 224/483 |
| 2005/0236541 | A1* | 10/2005 | Chang | B60R 11/02 |
| | | | | 248/231.81 |
| 2008/0224007 | A1* | 9/2008 | Mo | B60R 11/00 |
| | | | | 248/231.81 |
| 2010/0038509 | A1* | 2/2010 | Russell | H04R 1/083 |
| | | | | 248/288.11 |
| 2010/0219199 | A1* | 9/2010 | Andochick | B60R 7/084 |
| | | | | 221/199 |
| 2014/0138418 | A1* | 5/2014 | Dunn | B60R 11/02 |
| | | | | 224/483 |
| 2016/0174396 | A1* | 6/2016 | Wang | F16B 2/10 |
| | | | | 248/231.51 |
| 2019/0368655 | A1* | 12/2019 | Goldstein | F16M 11/2021 |
| 2021/0129768 | A1* | 5/2021 | Leimer | F16M 13/00 |
| 2021/0178862 | A1* | 6/2021 | Alves | B60R 11/02 |

* cited by examiner

AIR OUTLET FIXTURE

CROSS REFERENCE TO RELATED APPLICATIONS

This application claims the benefit of priority of Chinese Application No. 202021935795.2 filed on Sep. 5, 2020, the contents of which are incorporated by reference herein.

FIELD

The present disclosure generally relates to vehicle accessories, in particular to an air outlet fixture.

BACKGROUND

Air outlets on vehicles for discharging cold or warm air are arranged on both sides of the center console and external side of the driver's seat and the front passenger seat. There are also air outlets at the rear passenger seat. The air outlets at the rear passenger seat help to quickly balance the temperature in the vehicle. In order to facilitate use and expand functions, most vehicle owners will add a clamping structure to the air outlet, which can be used to assist in adjusting wind direction of the air outlet, or be used to install a mobile phone holder or perfume holder at the air outlet.

In order to increase a range of applicable vehicle types, a clamping force applied to air outlet blade of vehicle can be adjusted by rotating an adjusting means of the air outlet fixture. However, in actual use, users often rotate the adjusting means all the time because they are not sure whether the clamping force has become enough, and in this way, clamping arms on both sides of the air outlet blade are susceptible to deformation or even broken.

Therefore, there is an urgent need to provide an optimized air outlet fixture to prevent the clamping arms from deformation or broken due to over-adjustment.

BRIEF DESCRIPTION OF THE DRAWINGS

Implementations of the present technology will now be described, by way of example only, with reference to the attached figure, wherein.

Figure 1:
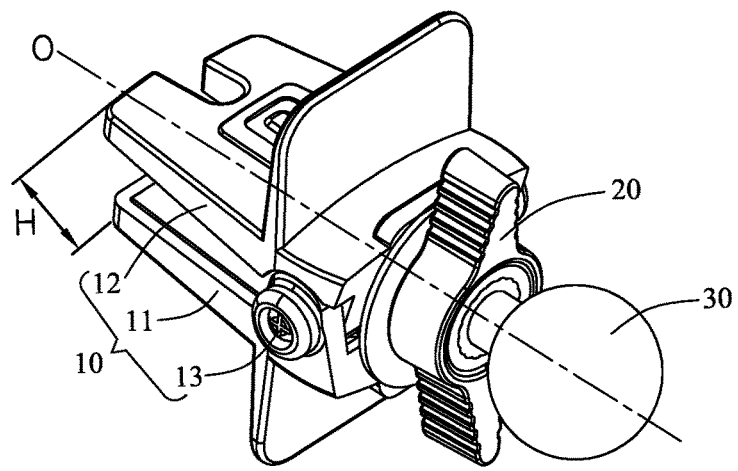
FIG. 1 is a perspective view of an air outlet fixture, according to a preferred embodiment of the disclosure.
Figure 2:
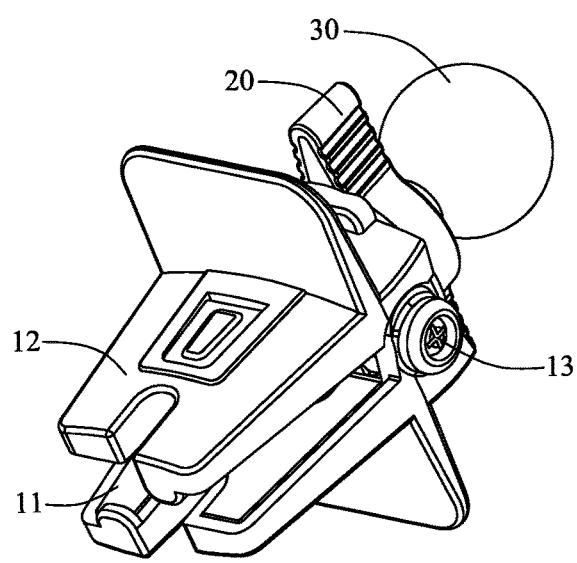
FIG. 2 is a perspective view of the air outlet fixture of FIG. 1, but viewed from another angle.

| DESCRIPTION OF REFERENCE NUMERAL | | | |
|---|---|---|---|
| 10 | clamping assembly | 11 | first clamping arm |
| 12 | second clamping arm | 13 | hinge |
| 111 | first arm body | | |
| 1111 | first clamping end | 11110 | inner surface |
| 1111a | stiffener | 11112 | first lower end |
| 1112 | first driving end | 11120 | end surface |
| 1113 | first pivotal portion | | |
| 1114 | first baffle | 1115 | first substrate mounting portion |
| 1116 | first force application end mounting portion | | |
| 11160 | first opening | | |
| 1117 | first force bearing end mounting portion | | |
| 11131 | extended shaft sleeve | 11151 | first limiting post |
| 112 | first reinforcing member | 1121 | first substrate |
| 1122 | first force application end | | |
| 1123 | first force bearing end | 11230 | rear surface |
| 1124 | first supporting end | 11211 | first limiting hole |
| 11221 | first protrusion | | |
| 113 | first anti-slip pad | | |
| 121 | second arm body | | |
| 1211 | second clamping end | 12110 | inner surface |
| 1211a | stiffener | 12112 | second lower end |
| 1212 | second driving end | 1213 | second pivotal portion |
| 1214 | second baffle | 1215 | second substrate mounting portion |
| 1216 | second force application end mounting portion | | |
| 12160 | second opening | | |
| 1217 | second force bearing end mounting portion | | |
| 122 | second reinforcing member | 1221 | second substrate |
| 1222 | second force application end | 1223 | second force bearing end |
| 1224 | second supporting end | 12211 | second limiting hole |
| 12221 | second protrusion | | |
| 123 | second anti-slip pad | | |
| 131 | shaft | | |
| 132 | elastic member | 1321 | winding portion |
| 1323 | connecting portion | 1325 | freedom end |
| 161 | first clamping portion | 162 | second clamping portion |
| 163 | third clamping portion | 164 | fourth clamping portion |
| 1611 | first projection | 1631 | second projection |
| 165 | first notch | 166 | second notch |
| 20 | adjusting means | 21 | knob |
| 22 | washer | 220 | front surface |
| 30 | connecting member | | |
| 31 | universal ball | 32 | connecting screw |
| 322 | through hole | O | symmetry axis |

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like. In particular, when describing "a certain element", the present disclosure does not limit the number of the element to one, and it may include more than one element.

The present disclosure provides an air outlet fixture, used to be hold at an air outlet of a vehicle, and is used to assist in adjusting wind direction of the air outlet, or is used in connection with a mobile phone holder, a perfume holder, or other devices. Please referring to FIG. 1 through FIG. 14, the air outlet fixture of a preferred embodiment of the present disclosure includes a clamping assembly 10, an adjusting means 20 and a connecting member 30. The clamping assembly 10 is configured to clamp at both sides of an air outlet blade of the vehicle to be fixed, and the connecting member 30 is coupled to the clamping assembly 10 and configured to be connected to an external device. The adjusting means 20 is arranged between the clamping assembly 10 and the connecting member 30, to adjust a clamping force of the clamping assembly 10.

The clamping assembly 10 comprises a first clamping arm 11, a second clamping arm 12 and a hinge 13. The hinge 13 interconnects the first clamping arm 11 and the second clamping arm 12 together to form a clamping body to clamp the air outlet blade from upper and lower directions.

Figure 3:
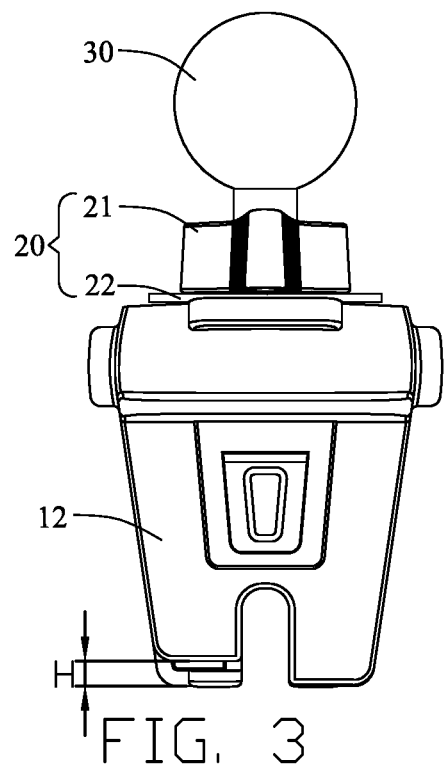
FIG. 3 is a top view of the air outlet fixture of FIG. 1.
Figure 4:
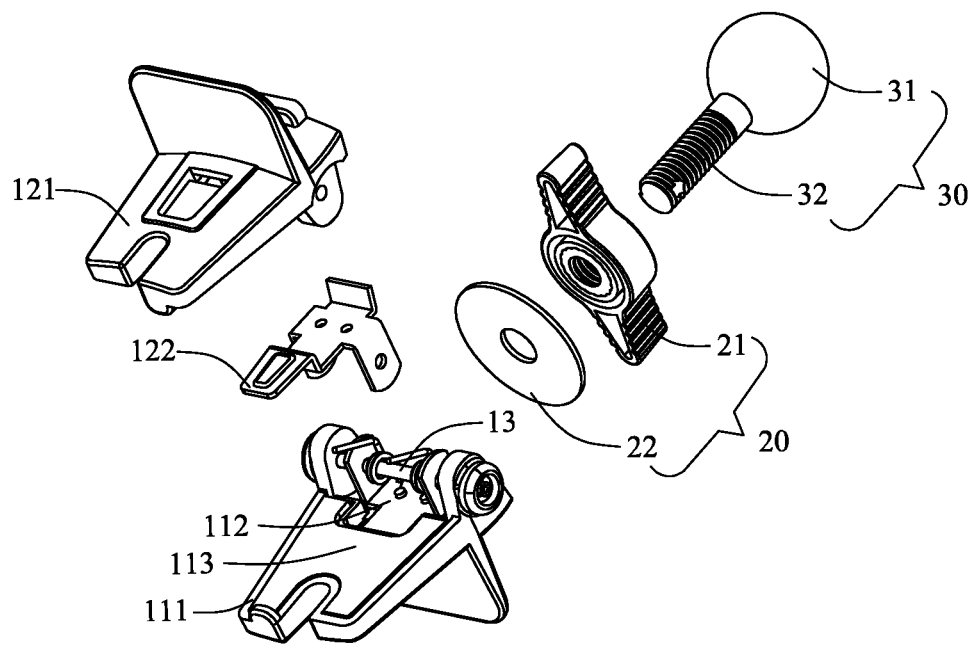
FIG. 4 is an exploded view of the air outlet fixture of FIG. 2.
Figure 10:
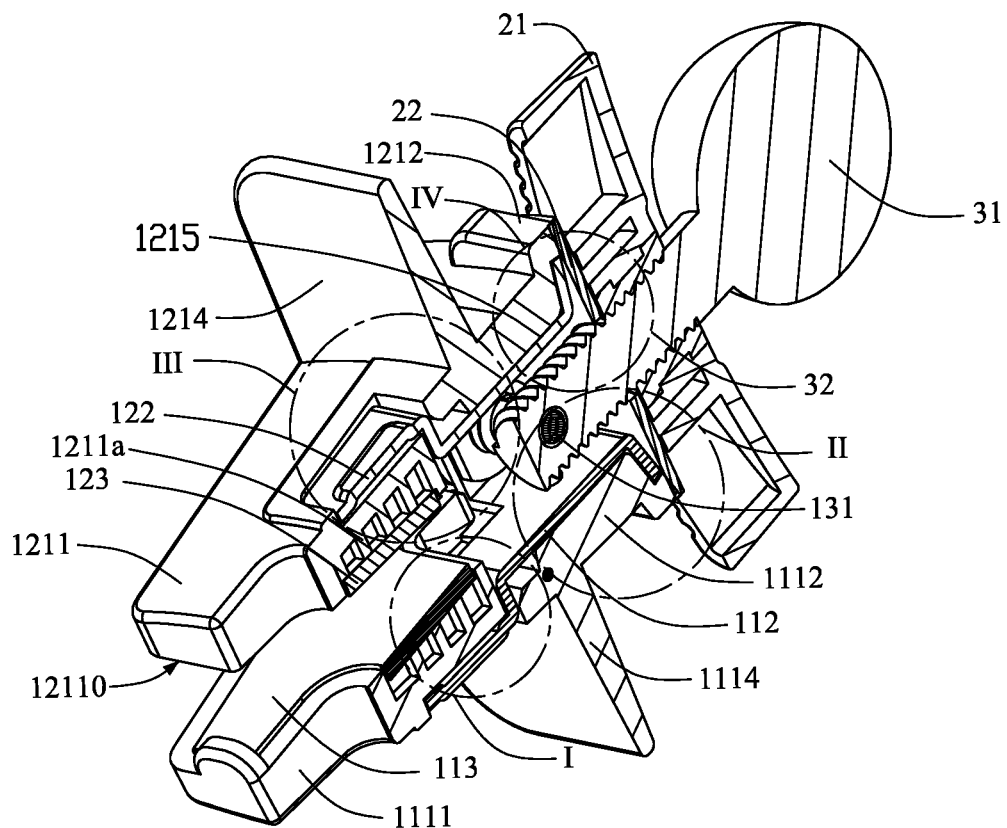
FIG. 10 is a perspective cut-away view of the air outlet fixture of FIG. 2, taken along a direction perpendicular to an axial direction of a hinge.
Figure 11:
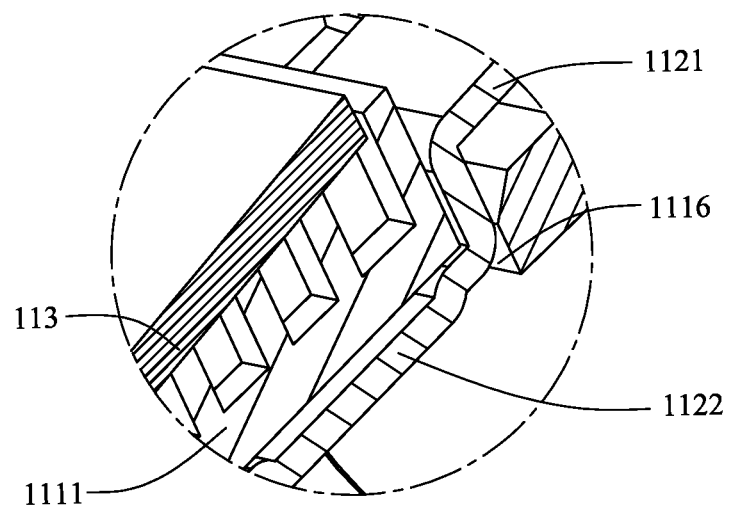
FIG. 11 is an enlarged view of circled portion I of FIG. 10.
Figure 12:
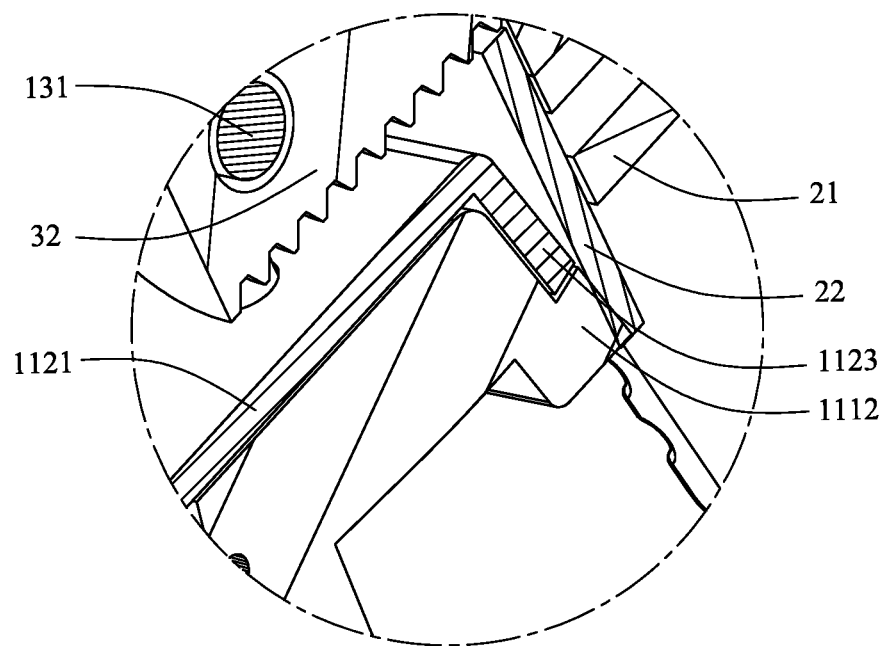
FIG. 12 is an enlarged view of circled portion II of FIG. 10.
Figure 13:
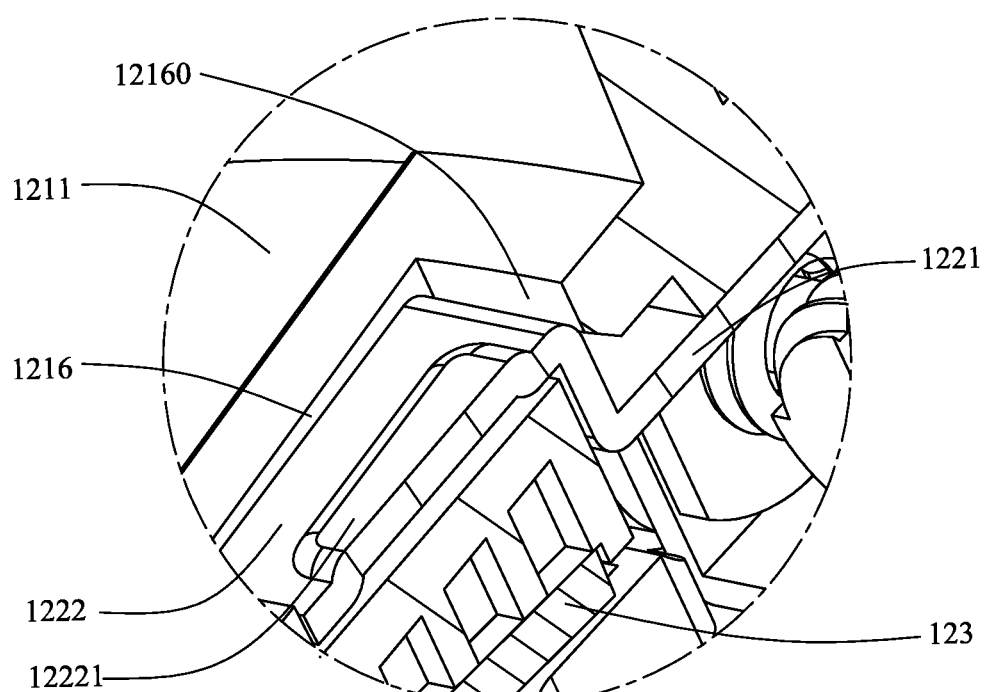
FIG. 13 is an enlarged view of circled portion III of FIG. 10.
Figure 14:
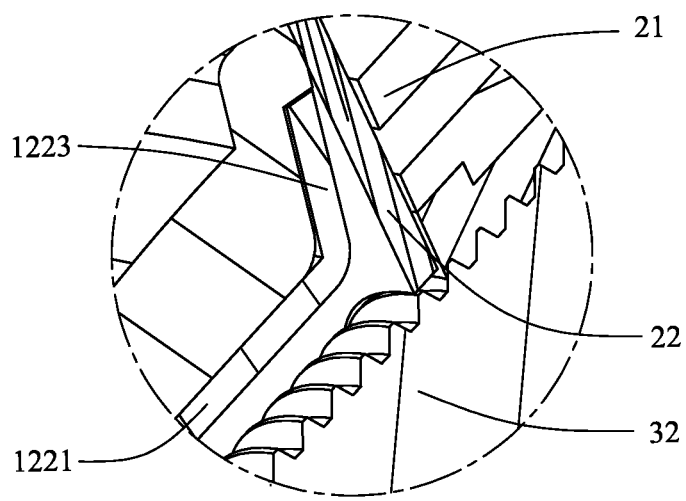
FIG. 14 is an enlarged view of circled portion IV of FIG. 10.

Referring to FIG. 3 and FIG. 4, the adjusting means 20 comprises a knob 21 and a washer 22 positioned in front of the knob 21. The connecting member 30 comprises a universal ball 31 and a connecting screw 32 in front of the universal ball 31. The knob 21 and the washer 22 are coiled around the connecting screw 32, and the knob 21 and the connecting screw 32 are threadedly matched. The universal ball 31 can be connected to a connection structure of an external device (such as a mobile phone holder, or a perfume holder). One end of the connecting screw 32 is connected to the universal ball 31, and the other end extends through the knob 21 and the washer 22 in turn to be connected to the hinge 13 (as shown in FIG. 10). Wherein, the washer 22 makes force generated by rotating the knob 21 to be uniformly applied to rear ends (ends near the knob 21) of the first clamping arm 11 and the second clamping arm 12. In one embodiment, the washer 22 is made of a metal material.

The first clamping arm 11 comprises a first arm body 111, a first reinforcing member 112, and a first anti-slip pad 113. The first reinforcing member 112 is assembled and fixed to the first arm body 111 to strengthen the structure of the first arm body 111. The first reinforcing member 112 is rotatably attached to the hinge 13. The first anti-slip pad 113 is attached to an inner side surface of the first arm body 111 for contact with the air outlet blade. The first anti-slip pad 113 is preferably made from soft rubber material, which may provide anti-slip and cushion characteristics.

Similarly, the second clamping arm 12 comprises a second arm body 121, a second reinforcing member 122, and a second anti-slip pad 123. The second reinforcing member 122 is assembled and fixed to the second arm body 121 to strengthen the structure of the second arm body 121. The second reinforcing member 122 is rotatably attached to the hinge 13. The second anti-slip pad 123 is attached to an inner side surface of the second arm body 121 for contact with the air outlet blade. The second anti-slip pad 123 is preferably made from soft rubber material, which may provide anti-slip and cushion characteristics.

Figure 6:
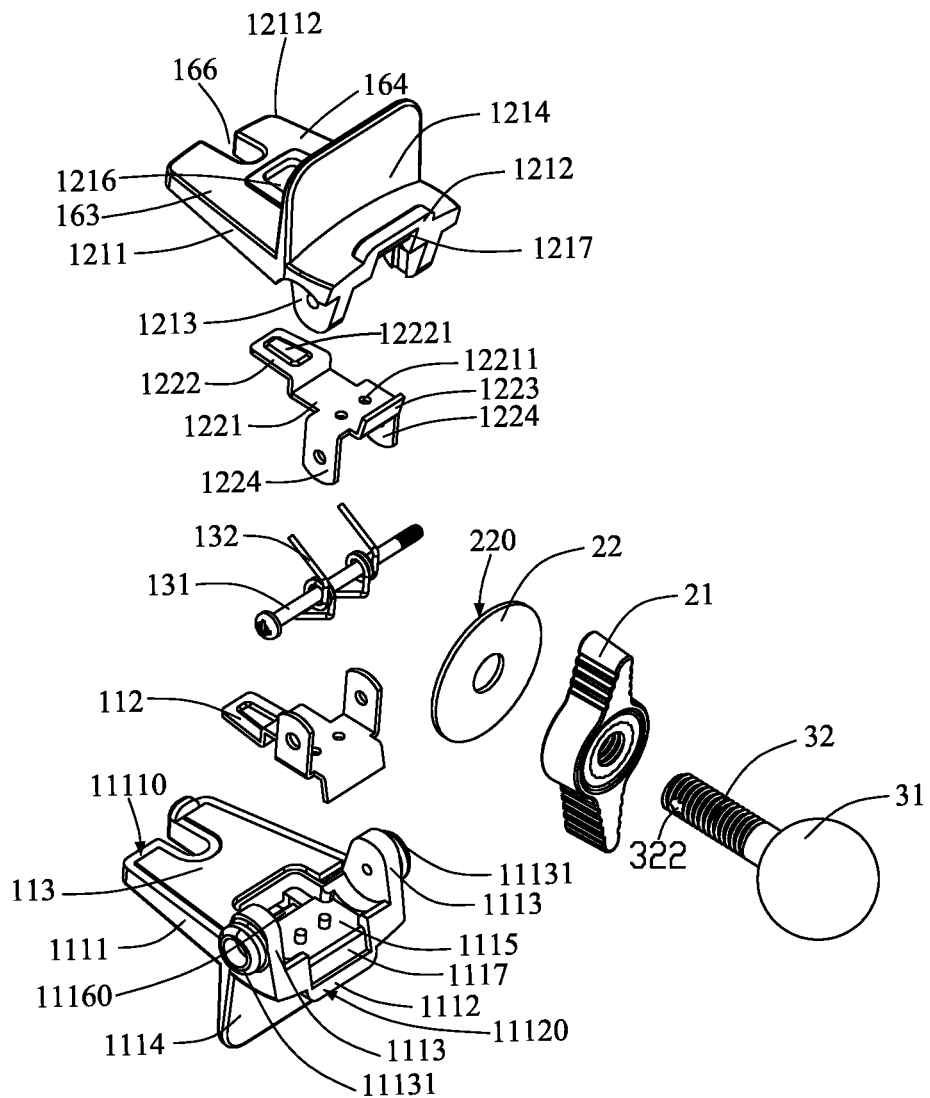
FIG. 6 is an exploded view of the air outlet fixture of FIG. 1.

Referring to FIG. 6, the first arm body 111 comprises a first clamping end 1111, a first driving end 1112, two first pivotal portions 1113, and a first baffle 1114. The first clamping end 1111 and the first driving end 1112 are located at two sides of the first pivotal portions 1113, respectively. The first clamping end 1111 is configured to clamp one side of the air outlet blade. The first driving end 1112 is used to release or close the air outlet fixture, and is controlled by force applied by the adjusting means 20 to control the clamping force of the first clamping end 1111 on the air outlet blade. The first baffle 1114 protrudes from and is substantially perpendicularly the first clamping end 1111. The first baffle 1114 extends away from the second arm body 121. The first baffle 1114 is used to abut against the air outlet from an external side and serves as an auxiliary support.

Correspondingly, the second arm body 121 comprises a second clamping end 1211, a second driving end 1212, two second pivotal portions 1213, and a second baffle 1214. The second clamping end 1211 and the second driving end 1212 are located at two sides of the second pivotal portions 1213, respectively. The second clamping end 1211 is configured to clamp the other side of the air outlet blade. The second driving end 1212 is used to release the air outlet fixture, and is controlled by the force applied by the adjusting member 20 to control the clamping force of the second clamping end 1211 on the air outlet blade. The second baffle 1214 protrudes from and is substantially perpendicularly second clamping end 1211. The second baffle 1214 extends away from the first arm body 111. The second baffle 1214 is used to abut against the air outlet from an external side and serves as an auxiliary support.

The hinge 13 comprises a shaft 131 and an elastic member 132 coiled around the shaft 131. The shaft 131 extends through the first pivotal portions 1113 of the first arm body 111 and the second pivotal portions 1213 of the second arm body 121. One end of the elastic member 132 abuts against the first arm body 111, and the other end abuts against the second arm body 121, thereby providing the first clamping arm 11 and the second clamping arm 12 with a torsion force around an axial direction of the shaft 131, respectively. In the illustrated embodiment, the elastic member 132 is a torsion spring.

Figure 8:
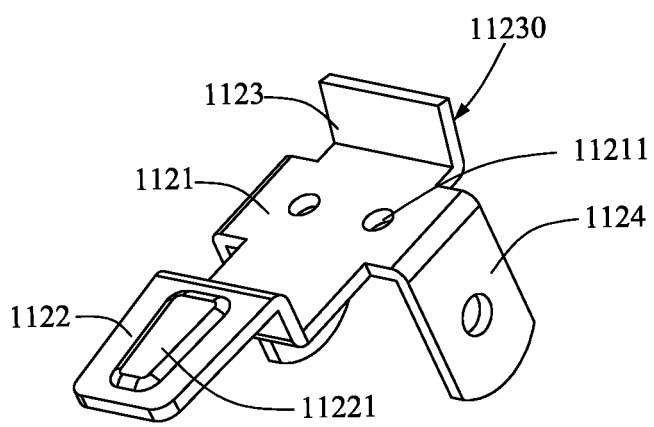
FIG. 8 is an enlarged view of a first strengthening member of FIG. 5.
Figure 9:
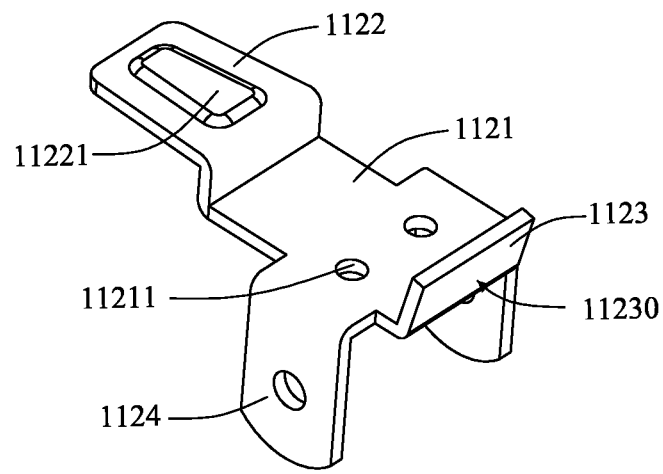
FIG. 9 is an enlarged view of a first strengthening member of FIG. 6.

Please referring to FIG. 8 and FIG. 9, the first reinforcing member 112 comprises a first substrate 1121, a first force application end 1122, a first force bearing end 1123, and two first supporting ends 1124. The first force application end 1122, the first force bearing end 1123, and the first supporting ends 1124 extends from the first substrate 1121. The first force application end 1122 and the first force bearing end 1123 are located at the front and rear ends of the first substrate 1121, respectively. The two first supporting ends 1124 are located at two sides of the first substrate 1121, respectively. The first substrate 1121 is mounted to an inner surface 11110 (see FIG. 6) of the first clamping end 1111 facing to the second clamping end 1211 and is placed in a first substrate mounting portion 1115 of the first clamping end 1111. The first force application end 1122 is mounted to an exterior surface of the first clamping end 1111 away from the second clamping end 1211 and is placed in a first force application end mounting portion 1116 (see FIG. 11) of the first clamping end 1111. The first force bearing end 1123 is mounted to end surface 11120 of the first driving end 1112 and is located in a first force bearing end mounting portion 1117 of the first driving end 1112. The first supporting ends 1124 are located at the inner side of the two first pivotal portions 1113. That is, the first supporting end 1124 extends from two sides of the first substrate 1121 and is mounted to the shaft 131 of the hinge 13, and the first force application end 1122 and the first force bearing end 1123 are located at opposite sides of a connecting line (shaft 131) of the two first supporting ends 1123, respectively. The first force bearing end 1123 is bent from a rear edge of the first substrate 1121 away from the first driving end 1112 and a rear surface 11230 abuts a front surface 220 of the washer 22 of the adjusting means 20 away from the universal ball 31.

To facilitate the positioning of the first reinforcing member 112, at least one first limiting post 11151 is formed in the first substrate mounting portion 1115, which cooperates with at least one first positioning hole 11211 defined in the first substrate 1121 for positioning. In the illustrated embodiment, two first positioning holes 11211 are defined side by side in the first substrate 1121, corresponding to two first limiting posts 11151 arranged side by side in the first substrate mounting portion 1115.

In order to increase the strength of the first reinforcing member 112, the first force application end 1122 protrudes outward to form a first protrusion 11221, and the first force application end mounting portion 1116 correspondingly defines a first opening 11160 (best shown in FIG. 6) to facilitate the installation of the first force application end 1122. Referring to FIG. 10, The first force application end 1122 extends through the opening 11160 from the inner side of the first clawing end 1111 to be accommodated in the first force application end mounting portion 1116, and abuts against the first clamping end 1111 to apply a torsion force to the first clamping end 1111. In other embodiments, the first protrusion 11221 may also be formed recessed inward in the first force application end 1122, which can also achieve a strengthening effect.

In the illustrated embodiment, a Z-shaped bend is formed between the first force application end 1122 and the first substrate 1121, and the first force bearing end 1123 bends upwardly from and is substantially perpendicular to the first substrate 1121.

The structure of the second reinforcing member 122 is similar to that of the first reinforcing member 112. The second reinforcing member 122 comprises a second substrate 1221, a second force application end 1222, a second force bearing end 1223, and two second supporting ends 1224. The second force application end 1222, the second force bearing end 1223, and the second supporting ends 1224 extend from the second substrate 1221. The second force application end 1222 and the second force bearing end 1223 are located at the front and rear ends of the second substrate 1221, respectively. The two second supporting ends 1224 are located at two sides of the second substrate 1221, respectively. Similarly, the second substrate 1221, the second force application end 1222, and the second force end 1223 are located in a second substrate mounting portion 1215(see FIG. 10), a second force application end mounting portion 1216, and a second force bearing end mounting portion 1217 of the second arm body 121, respectively. The two second supporting ends 1124 are located at the inner side of the two second pivotal portions 1213.

In order to increase the strength of the second reinforcing member 122, the second force application end 1222 protrudes outward to form a second protrusion 12221, and the second force application end mounting portion 1216 is correspondingly defines a second opening 12160 (see FIG. 13) to facilitate the installation of the second force application end 1222. Referring to FIG. 10, the second force application end 1222 extends through the second opening 12160 from the inner side of the second clamping end 1211 to be accommodated in the second force application end mounting portion 1216, and abuts against the second clamping end 1211 to apply a torsion force to the second clamping end 1211. Similarly, in other embodiments, the second protrusion 12221 can also be formed recessed inward in the second force application end 1222, which can also achieve a strengthening effect.

Similar to the first reinforcing member 112, in the illustrated embodiment, a Z-shaped bend is formed between the second force application end 1222 and the second base plate 1221, and the second force bearing end 1223 bends upwardly from and is substantially perpendicular to the second substrate 1221.

The shaft 131 of the hinge 13 extends through the first pivotal portion 1113 of the first arm body 111, the second pivotal portion 1213 of the second arm body 121, the first supporting ends 1124, and the second supporting ends 1224, as such, the first force bearing end 1123 and the second force bearing end 1223 bears the pressure exerted by the adjusting component 20 that should be borne by the first driving end 1112 and the second driving end 1212, to avoid that the pressure applied by the adjusting component 20 is transmitted to the corresponding pivotal structure by the first driving end 1112 and the second driving end 1212, causing the pivotal structure to break.

A Z-shaped bend is formed between the first force application end 1122 and the first substrate 1121, and a Z-shaped bend is formed between the second force application end 1222 and the second substrate 1221. As such, when pressure is applied to the first force bearing end 1123 and the second force bearing end 1223, the first supporting ends 1124 and the second supporting ends 1224 form something like a fulcrum of lever, which transmits the pressure to the first force application end 1122 and the second force application end 1222, and the first force application end 1122 and the second force application end 1222 apply a clamping force to the first clamping end 1111 of the first arm body 111 and the second clamping end 1211 of the second arm body 121, respectively. By this way, the first reinforcing member 112 and the second reinforcing member 122 will bear most of the force. Since the first reinforcing member 112 and the second reinforcing member 122 may be made of a metal material with greater strength and greater hardness, the resistance to deformation and/or breaking of the first reinforcing member 112 and the second reinforcing member 122 is stronger than that of the first arm body 111 and the second arm body 121 both made of plastic material, so the problem of breakage of the clamping arm can be fundamentally solved.

Figure 7:
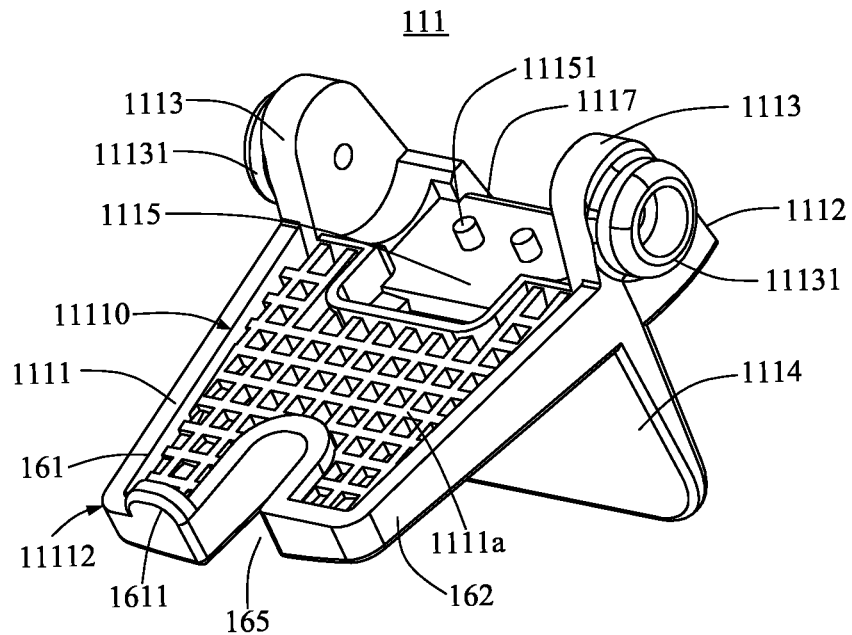
FIG. 7 is an enlarged view of a first arm body of FIG. 5.

Referring to FIG. 7 and FIG. 10, the inner surface 11110 of the first clamping end 1111 of the first arm body 111 and the inner surface 12110 of the second clamping end 1211 of the second arm body 121 are provided with interlaced stiffeners 1111*a*, 1211*a*. The first anti-slip pad 113 and the second anti-slip pad 113 are attached to the stiffeners 1111a, 1211a to further improve the resistance of breaking of the clamping arms.

Figure 5:
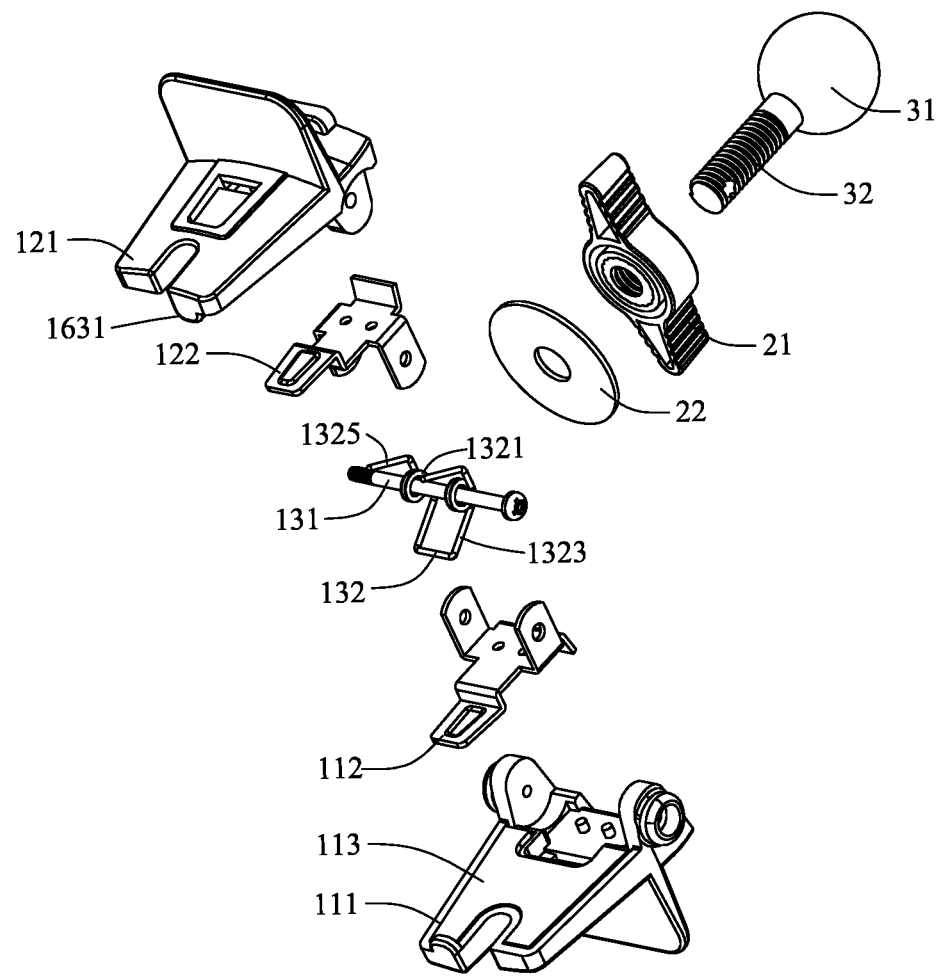
FIG. 5 is a further exploded view of the air outlet fixture of FIG. 3.

Two of the pivotal portions of the first arm body 111 and the second arm body 121, which are located at outer side relative to another two pivotal portions (which are the two first pivotal portions 1113 on the first arm body 111 in the illustrated embodiment), are provided with an extended shaft sleeve 11131 protruding outward along the axial direction of the shaft 131, respectively, as shown in FIGS. 3, 5, and 7. Each extended shaft sleeve 11131 and one corresponding first pivotal portion 1113 are integrally formed to allow the shaft 131 to extend through and to accommodate two ends of the shaft 131, respectively. By this way, the pivotal portions are thickened, which can further prevent the pivotal portions from being deformed/broken.

In at least one embodiment, each of the first substrate mounting portion 1115, the second substrate mounting portion 1215, the first force application end mounting portion 1116, the second force application end mounting portion 1216, the first force bearing end mounting portion 1117, and the second force bearing end mounting portion 1217 is a recess formed in surface of the first arm body or in surface of the second arm body.

In at least one embodiment, first substrate mounting portion 1115, the first force application end mounting portion 1116, and are in air communication with each other; and the second substrate mounting portion 1215, the second force application end mounting portion 1216, and the second force bearing end mounting portion 1217 are in air communication with each other.

In at least one embodiment, the elastic member 132 comprises two winding portions 1321 spaced apart from each other and a connecting arm 1323 located between and connected to the two winding portions 1321, the two winding portions 1321 are coiled around the shaft 131, each of the two winding portions 1321 has an extending end 1325, the freedom end 1325 abuts against the first clamping arm 11, and the connecting arm 1323 abuts against the second clamping arm 12.

In at least one embodiment, the end of the connecting screw 32 connected to the clamping assembly defines a through hole 322, the shaft 131 extends through the through hole 322.

At least one of the first clamping arm 11 and the second clamping arm 12 has at least a portion (such as the portions in FIG. 7 labeled with 161 and the portion in FIG. 6 labeled with 163) longer than a corresponding portion (such as the portions in FIG. 7 labeled with 162 and the portion in FIG. 6 labeled with 164) of another one of the first clamping arm 11 and the second clamping arm 12. Namely, there is gap H (see FIG. 1) between a lower end of the portion relative longer and a lower end of the corresponding portion relative shorter a long a direction of a symmetry axis O between the first clamping arm 11 and the second clamping arm 12. That is, there is gap H (see FIG. 3) between a lower end of the portion relative longer and a lower end of the corresponding portion relative shorter in at least a state, such as in a closed state, wherein in the closed state the first clamping arm 11 and the second clamping arm 12 has a smallest included angle or even is in contact with each other. Such configuration facilitates clamping thinner air outlet blade, allows the air outlet fixture is adapted to air outlet blades of multiple thickness.

At least one of the first clamping arm 11 and the second clamping arm 12 has a projection (such as the portion in FIG. 7 labeled with 1611 and the portion in FIG. 5 labeled with 1631) protruding forwards another one of the first clamping arm 11 and the second clamping arm 12. The projection extends from the portion of the first clamping arm 11 and the second clamping arm 12 having a relative greater length, such as the portions in FIG. 7 labeled with 161 and the portion in FIG. 6 labeled with 163. When the air outlet fixture clamps on the air outlet blade, the projection can abut against the air outlet blade from a rear side, thereby preventing falling from the air outlet blade.

In at least one embodiment, referring to FIG. 7, the first clamping end 1111 forms a first clamping portion 161 and a second clamping portion 162 at a first lower end 11112 away from the first driving end 1112, and the second clamping end 1211 forms a third clamping portion 163 and a fourth clamping portion 164 at a second lower end 12112 away from the second driving end 1212. Along a direction from the first clamping end 1111 to the first driving end 1112, the first clamping portion 161 is longer than the second clamping portion 162; and along a direction from the second clamping end 1211 to the second driving end 1212, the third clamping portion 163 is longer than the fourth clamping portion 164. The first clamping portion 161 faces the fourth clamping portion 164, and the second clamping portion 162 faces the third clamping portion 163. The first clamping portion 161 forms a first projection 1611 protruding forwards the fourth clamping portion 164, and the third clamping portion 163 forms a second projection 1631 (shown in FIG. 5) protruding forwards the second clamping portion 162. A first notch 165 is formed between the first clamping portion 161 and the second clamping portion 162, and a second notch 166 is formed between the third clamping portion 163 and the fourth clamping portion 164. The first notch 165 and the second notch 166 is configured for adapting vertical contractures on the air outlet blade, thereby expanding an application scope of the air outlet fixture.

In other embodiments, the first clamping arm 11 or the second clamping arm 12 has no notch, one of the first clamping arm 11 and the second clamping arm 12 is entirely longer than another one of the first clamping arm 11 and the second clamping arm 12, and the projection extends from the one relative longer.

In at least one embodiment, the shaft 131 has a threaded end used to mate with a nut.

In summary, the present disclosure provides an air outlet fixture. The clamping assembly is provided with reinforcing members on the clamp arm bodies of the first clamp arm and the second clamp arm to strengthen the clamping structure and prevent deformation and breakage. The first reinforcing member and the second reinforcing member may be made of a metal material with greater strength and hardness, and the resistance to deformation/breakage the first reinforcing member and the second reinforcing member is stronger than that of plastic material, thus the problem of breakage of the clamping arms can be fundamentally solved. Each reinforcing member has a structure comprising the substrate, with the force application end, the force bearing end, and the supporting end extending from the substrate, when the force bearing end of the reinforcing member is applied with pressure, the supporting ends of the reinforcing member form something like a fulcrum of lever, and the pressure is transmitted to the force application end. Clamping force is applied to the clamping end of the arm body, as such the reinforcing member and the second reinforcing member will bear most of the force, weakening the effect of the force on the arm body, and preventing the clamping assembly from deforming and breaking. The inner surface of each clamping end of the arm body is provided with interlaced stiffeners, and an anti-slip pad of soft rubber is attached to the stiffeners, which can further improve the structural strength and resistance to breakage of the clamping arm. The two outer side pivotal portions of the two clamping arm bodies are respectively provided with portions protruding outward in the axial direction of the shaft, respectively. The addition of thickened portions can further prevent the pivotal portions from being deformed/broken.

The embodiments shown and described above are only examples. Many details are often found in the art such as the other features of a server. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An air outlet fixture, comprising:
   a clamping assembly comprising a first clamping arm, a second clamping arm, and a hinge interconnecting the first clamping arm and the second clamping arm, the first clamping arm comprising a first arm body, and the second clamping arm comprising a second arm body;
   an adjusting means coupled to the clamping assembly and configured for adjusting a clamping force of the clamping assembly; and
   a connecting member mounted to the clamping assembly and configured for connecting to an external device;
   wherein the clamping assembly further comprises a reinforcing member mounted to one of the first arm body and the second arm body, in at least one state the reinforcing member is driven by the adjusting means;
   wherein the hinge comprises a shaft and an elastic member coiled around the shaft, one end of the elastic member abuts against the first clamping arm, and the other end abuts against the second clamping arm.

2. The air outlet fixture of claim 1, wherein at least one of the first clamping arm and the second clamping arm has at least a portion longer than a corresponding portion of another one of the first clamping arm and the second clamping arm.

3. The air outlet fixture of claim 2, wherein a projection protrudes from the first clamping arm towards the second clamping arm, and another projection protrudes from the second clamping arm towards the first clamping; or a projection protrudes from either the first clamping arm or the second clamping arm towards the other one of the first clamping arm and the second clamping arm.

4. The air outlet fixture of claim 3, wherein the projection extends from the portion of the first clamping arm and the second clamping arm having a relative greater length.

5. The air outlet fixture of claim 1, wherein all of the first arm body, the second arm body, and the reinforcing member are rotatably mounted to the hinge.

6. The air outlet fixture of claim 1, wherein the reinforcing member comprises a substrate, a force application end, a force bearing end, and two supporting ends, the force application end, the force bearing end, and the two supporting ends all extend from the substrate; the two supporting ends extend and bend from two sides of the substrate and are mounted to the hinge; the force application end and the force bearing end are located at opposite sides of an axis connecting the two supporting ends.

7. The air outlet fixture of claim 6, wherein the force bearing end extends and bends from an edge of the substrate, and a rear surface of the force bearing end abuts a front surface of the adjusting means in at least one state.

8. The air outlet fixture of claim 6, wherein a Z-shaped bend is formed between the force application end and the substrate.

9. The air outlet fixture of claim 6, wherein the force application end forms a protrusion protruding outward or protruding inward.

10. The air outlet fixture of claim 6, wherein each of the first arm body and the second arm body comprises a clamping end for clamping at a side of an air outlet blade, a driving end driven by the adjusting means, and two pivotal portions connected to the hinge; a substrate mounting portion is formed between the clamping end and the driving end, the clamping end defines a force application end mounting portion, and the clamping end defines a force bearing end mounting portion;
   and the two supporting ends are located at the inner side of the two pivotal portions.

11. The air outlet fixture of claim 1, wherein each of the first arm body and the second arm body comprises a clamping end, a driving end driven by the adjusting means, and two pivotal portions connected to the hinge; two of the pivotal portions of the first arm body and the second arm body, which are located at outer side relative to another two pivotal portions, are provided with an extended shaft sleeve protruding outward along the axial direction of the hinge, respectively.

12. The air outlet fixture of claim 1, wherein a hardness of the reinforcing member is greater than a hardness of the first arm body and/or the second arm body.

13. The air outlet fixture of claim 1, wherein the first arm body and the second arm body are formed of plastic, and the reinforcing member is formed of metal.

14. The air outlet fixture of claim 1, wherein the reinforcing member comprises a force application end, each of the first arm body and the second arm body comprises a clamping end, the clamping end has a force application end mounting portion in an exterior surface, and the force application end is mounted in the force application end mounting portion.

15. The air outlet fixture of claim 1, wherein the adjusting means coupled to the clamping assembly through the connecting member.

16. The air outlet fixture of claim 15, wherein the adjusting means comprises a knob and a washer; the connecting member comprises a universal ball and connecting screw coupled to the universal ball, one end of the connecting screw is connected to the universal ball, and the other end extends through the knob and the washer in turn to be connected to the clamping assembly; and the knob and the connecting screw are threadedly matched.

17. The air outlet fixture of claim 1, wherein the first arm body comprises a first baffle extending away from the second arm body, and the second arm body comprises a second baffle extending away from the first arm body.

18. An air outlet fixture comprising:
   a clamping assembly comprising a first clamping arm, a second clamping arm, and a hinge interconnecting the first clamping arm and the second clamping arm, the first clamping arm comprising a first arm body, and the second clamping arm comprising a second arm body;

an adjusting means coupled to the clamping assembly and configured for adjusting a clamping force of the clamping assembly; and a connecting member mounted to the clamping assembly and configured for connecting to an external device;

wherein the clamping assembly further comprises a reinforcing member mounted to one of the first arm body and the second arm body, in at least one state the reinforcing member is driven by the adjusting means;

wherein the first arm body comprises a first baffle extending away from the second arm body, and the second arm body comprises a second baffle extending away from the first arm body.

19. An air outlet fixture comprising:

a clamping assembly comprising a first clamping arm, a second clamping arm, and a hinge interconnecting the first clamping arm and the second clamping arm, the first clamping arm comprising a first arm body, and the second clamping arm comprising a second arm body;

an adjusting means coupled to the clamping assembly and configured for adjusting a clamping force of the clamping assembly; and a connecting member mounted to the clamping assembly and configured for connecting to an external device;

wherein the clamping assembly further comprises a reinforcing member mounted to one of the first arm body and the second arm body, in at least one state the reinforcing member is driven by the adjusting means;

wherein the first arm body comprises a first clamping portion and a second clamping portion, the second arm body comprises a third clamping portion and a fourth clamping portion; the first clamping portion faces the fourth clamping portion and is longer than the fourth clamping portion, the second clamping portion faces the third clamping portion and is longer than the third clamping portion; and the first clamping portion forms a first projection and the third clamping portion forms a second projection.

20. The air outlet fixture of claim 19, wherein a first notch is formed between the first clamping portion and the second clamping portion, and a second notch is formed between the third clamping portion and the fourth clamping portion.

* * * * *